(12) United States Patent
Bertolotti et al.

(10) Patent No.: US 6,513,734 B2
(45) Date of Patent: Feb. 4, 2003

(54) PRESSURE COMPENSATED DISCHARGE EMITTER

(75) Inventors: Giacomo Bertolotti, 15 Ivy La., Lynchburg, VA (US) 06074; Fabio P Bertolotti, South Windsor, CT (US)

(73) Assignee: Giacomo Bertolotti, Lynchburg, VA (US)

( * ) Notice: Subject to any disclaimer, the term of this patent is extended or adjusted under 35 U.S.C. 154(b) by 0 days.

(21) Appl. No.: 09/756,639

(22) Filed: Jan. 8, 2001

(65) Prior Publication Data

US 2002/0088877 A1 Jul. 11, 2002

(51) Int. Cl.[7] ............................... B05B 1/30
(52) U.S. Cl. ........................... 239/542; 239/533.13
(58) Field of Search ........................... 239/542, 568, 239/DIG. 12, 547, 533.13, 546

(56) References Cited

U.S. PATENT DOCUMENTS

| 3,902,664 A | 9/1975 | Deines |
| 3,917,169 A | 11/1975 | Harmony |
| 3,970,251 A | 7/1976 | Harmony |
| 3,993,248 A | 11/1976 | Harmony |
| 4,077,570 A | 3/1978 | Harmony |
| 4,077,571 A | 3/1978 | Harmony |
| 4,095,745 A | 6/1978 | Christy et al. |
| 4,113,180 A | 9/1978 | Christy et al. |
| 4,132,364 A | 1/1979 | Harmony |
| 4,176,791 A | 12/1979 | Cattaneo et al. |
| 4,210,287 A | 7/1980 | Mehoudar |
| 4,247,051 A | 1/1981 | Allport |
| 4,512,514 A | 4/1985 | Elcott |
| 4,850,531 A | 7/1989 | Littleton |
| 4,984,739 A | 1/1991 | Allport |
| 5,141,360 A | * 8/1992 | Zeman |
| 5,249,745 A | 10/1993 | Bertoloti |
| 5,267,690 A | 12/1993 | Gazzoni |
| 5,531,381 A | 7/1996 | Ruttenberg |
| 5,620,143 A | 4/1997 | Delmer et al. |
| 5,634,595 A | 6/1997 | DeFrank et al. |
| 5,695,127 A | 12/1997 | Delmer et al. |
| 5,785,785 A | 7/1998 | Delmer et al. |

FOREIGN PATENT DOCUMENTS

WO   WO 94/25173   * 11/1994

* cited by examiner

Primary Examiner—Lesley D. Morris

(57) ABSTRACT

A a drip irrigation system comprises a hose with a flexible wall circumscribing and bounding a main flow-path for carrying irrigation fluid, and pressure-compensated emitters spaced along the length of the hose and providing a communicating channel between the main flow-path and a region at lower pressure outside the main flow-path, such as the region outside the hose, the pressure-compensating function of the emitters producing a flow-rate through the emitters that is weakly dependent on the pressure differential across the emitters. The pressure compensated emitters comprise one slit extending through the flexible wall, the slit interrupting the circumferential stresses in the flexible wall when the flow-path is pressurized, the stress interruption simultaneously causing a dilatation of the slit and an outwardly radial displacement in the single wall material adjacent to, and around the slit, and protrusions connected to the flexible wall and extending from the perimeter of the slit towards the main flow-path to form an outwardly diverging discharge channel with an inlet facing the inward fluid region, the outwardly diverging discharge channel connecting the inward fluid region to the slit, the protrusions narrowing the cross-sectional area of the inlet to increase the hydrodynamic resistance of the discharge channel in response to both the dilatation of the slit and to the outward displacement of the wall material adjacent to and around the slit.

10 Claims, 5 Drawing Sheets

Figure 2a
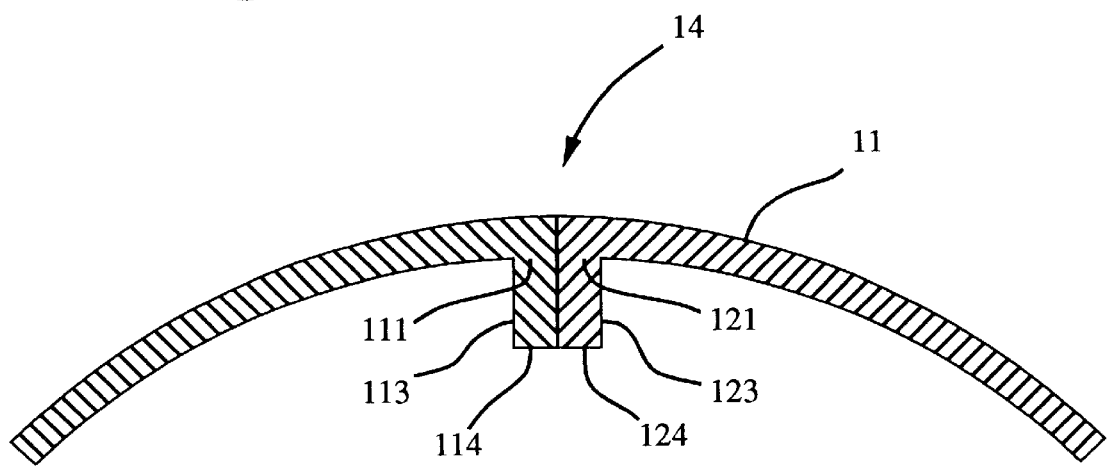
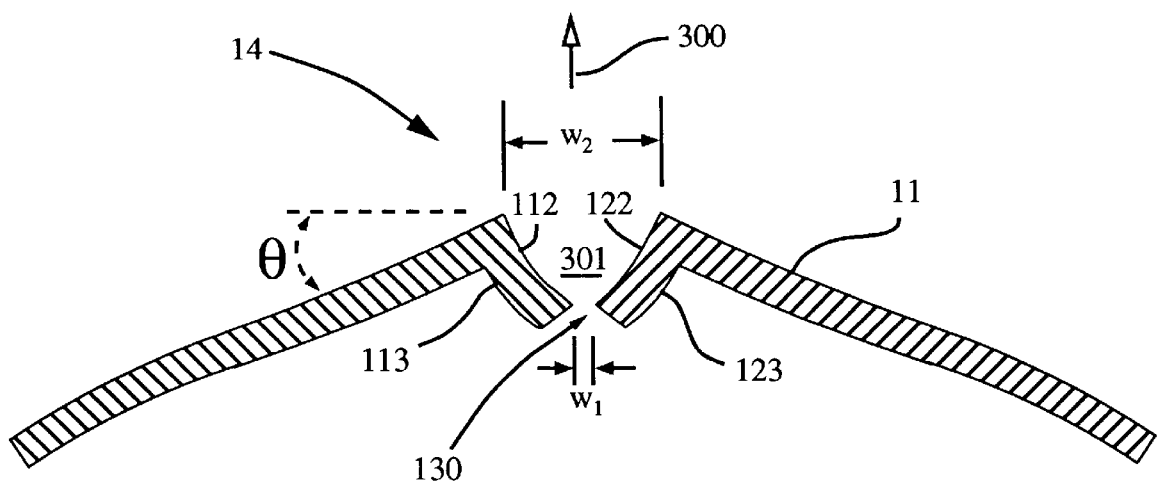
Figure 2b

PRESSURE COMPENSATED DISCHARGE EMITTER

FIELD OF THE INVENTION

This invention relates to drip irrigation, and, more particularly, to a drip-irrigation hose with an improved emitter construction, and like.

BACKGROUND OF THE INVENTION

Drip irrigation systems are designed to deliver small amounts of water at selected locations along a hose. The hose carries water under pressure and the delivery of small amounts of water is achieved by discharging the water through small orifices, or emitters, with high hydrodynamic resistance to the flow of water.

Two types of drip hoses have contributed to the worldwide diffusion of drip irrigation: tapes and tubing. Tapes are collapsible hoses with thin walls in the range 4–20 thousandth of an inch, operating at low pressure, typically in the range of 5–20 psig, with built-in orifices. They are made from a strip of plastic film, upon which molten plastic beds for the orifices are deposited, and the sides of the strip bent over each other and welded to form a multi-chamber hose. Tubing has thicker, more rigid, walls than tapes and the most popular types of tubing have pre-installed emitters. The tubing is manufactured by extrusion and the emitters are simultaneously inserted in succession within the tube as the tube is being extruded. Tapes are most commonly used for annual or seasonal row crop while tubing is used more often on perennial crop.

The emitters may be materially separate from the tube and inserted into the tube at longitudinally spaced locations, as shown in U.S. Pat. No 4,850,531, or may be integral to the tape construction and positioned near one another longitudinally along the tape to functionally approximate a Continuous line-source of water. In the case of emitters separate from the tube, the hydrodynamic resistance is generated by a small tortuous flow-path located within the emitter body, while in the case of tile integral emitters the hydrodynamic resistance to water flow is provided mainly by a long secondary flow-path of small cross-sectional area. as shown in U.S. Pat. No 4,247,051, with additional resistance coming from orifices of small cross-sectional area in communication with the secondary flow-path and in communication with the exterior of the hose, as shown in U.S. Pat. No 5,634,595.

Generally, when hydrodynamic resistance is produced by either a tortuous flow-path, or a secondary flow-path having an essentially fixed and non-deformable shape, the emitted water flow-rate increases significantly with internal hose pressure. This is an undesired property since hose pressure necessarily drops along the run of the hose due to friction (viscosity) to water flow, leading to the problem of overwatering plants at locations near the inlet of the hose, where the hose pressure is high, and under-watering plants distant from this inlet end, where the hose pressure is low. The uneven water delivery is aggravated when the hose is inclined with respect to the horizontal, as when lying on a hill, whereby the effect of gravity further increases the pressure variation along the hose.

In addition to the problem of uniform water ejection along the length of the irrigation hose, drip irrigation systems are prone to clogging from suspended particulates in the irrigation fluid. The supply of irrigation water must be filtered upstream of the irrigation hose to alleviate the clogging problem.

Recent developments in drip irrigation have shown that it is often advantageous to bury the irrigation hose below the ground to bring water directly to the root-system of the plants and avoid water-loss due to evaporation to the atmosphere, to reduce top-soil humidity leading to a reduction of grow of weeds and fungi and the corresponding reduction in the use of weed killers and fungicides, and to eliminate damages to the irrigation system caused by pickers, pruners and farm equipment.

Unfortunately, the clogging problem becomes particularly grave when the drip irrigation line is buried. The general experience so far accumulated with sub-soil irrigation has identified the following major problems:

intrusion of the tree root into the system through the orifices;

orifice and emitter clogging due to clay and silt entering the irrigation hose during de-pressurization of the hose at shut-down, (in addition to the conventional clogging caused by foreign particles carried by the irrigation water);

difficulty in detecting, locating, and repairing underground clogged orifices and emitters.

U.S. Pat. No. 5,785,785 etc, attempts to solve the problem of clogging and simultaneously achieve uniform water distribution along the run of the hose by using a secondary flow-passage with variable resistance, and flaps on the orifices that should keep environmental water from entering the hose when the hose is un-pressurized. However, upon close examination it is evident that the thinness of the wall material, quoted as being between 4 and 20 mils, does not supply enough rigidity to the orifices nor sufficient facial contact area between opposing walls of the orifice to seal the orifice when fluid pressure is removed from the hose.

U.S. Pat. Nos. 3,917,169 (1975), 3,970,251 (1976), 3,993, 248 (1976), 4,077,570 (1978), 4,077,571 (1978), and 4,132, 364 (1979), all by R. C. Harmony, attempt to solve the clogging problem and simultaneously achieve uniform water distribution along the run of the hose by using flexible skirts descending into the irrigation hose from the perimeter of each orifice, the skirts forming a channel leading to the discharge orifice. To generate a high hydrodynamic resistance in the channel, stria, or corrugations, are build into the surface of the skirts. The stria are claimed to generate turbulent and random flow that establishes a fluid pressure gradient along the channel. The combination of stria and flexible skirts is claimed to achieve a pressure-compensating function that provides a uniform distribution of water discharge along the length of the hose. For the stria to create the necessary pressure gradient, the skirts must be long and penetrate deep within the irrigation hose or tube. Consequently, the designs in the above mentioned patents by Harmony are incompatible with the established production techniques of tube extrusion or of tape rolling, folding and bonding. Furthermore, in all of Harmony's designs the channel leading to the orifice has a convergent shape, being widest at the entrance and narrowest at the orifice. This convergence is conducive to clogging from within when particles are present in the irrigation fluid.

OBJECTS AND ADVANTAGES

Accordingly, several objects and advantages of our invention are:

a) A pressure-compensated discharge emitter having a variable hydrodynamic resistance that increases with increasing pressure-drop across the emitter to produce a discharge flow-rate weakly dependent on the pressure-drop across the emitter;

b) An irrigation hose with a plurality of said pressure compensated emitters leading to an essentially uniform distribution of discharged irrigation fluid per unit time along the length of the hose, even in the presence of pressure variations along the hose;

c) A pressure-compensated discharge emitter providing a good self-closure when the hose is depressurized, thereby hindering soil and plant root ingestion into the emitter;

d) A pressure-compensated discharge emitter having low stress concentrations in the material surrounding the emitter.

e) A pressure compensated emitter buildable simultaneously with the irrigation tube during the extrusion process, without insertion of additional parts during the extrusion process.

f) A pressure compensated emitter for drip-irrigation tape, the emitter eliminating the need of secondary fluid conduits within the tape.

SUMMARY OF THE INVENTION

The present invention provides a drip irrigation system comprising: (a) a hose with a flexible wall circumscribing and bounding a main flow-path for carrying irrigation fluid, and (b) pressure-compensated emitters spaced along the length of the hose and providing a communicating channel between the main flow-path and a region at lower pressure outside the main flow-path, such as the region outside the hose, wherein the pressure-compensating function of the emitters produces a flow-rate through the emitters that is weakly dependent on the pressure differential across the emitters.

At least portion of the hose's flexible wall is a single wall that directly separates the main flow-path from the region at lower pressure outside the main flow-path. The pressure compensated emitters are located on the single wall, and comprise (a) one slit extending through the single wall, the slit interrupting the circumferential stresses in the single wall when the flow-path is pressurized, the stress interruption simultaneously causing a dilatation of the slit and an outwardly radial displacement in the single wall material adjacent to, and around the slit, and (b) protrusions connected to the single wall and extending from the perimeter of the slit towards the main flow-path to form a discharge channel with an inlet facing the inward fluid region, the discharge channel connecting the inward fluid region to the slit, the protrusions narrowing the cross-sectional area of the inlet to increase the hydrodynamic resistance of the discharge channel in response to both the dilatation of the slit and to the outward displacement of the wall material adjacent to and around the slit.

The narrowing of the inlet increases the hydrodynamic resistance of the emitter in response to an increase in slit dilatation and outward displacement following an increase in pressure differential between the main flow-path pressure and the pressure in the outward receiving region, whereby the increase in hydrodynamic resistance counteracts the increase in pressure force to produce a discharge flow-rate weakly dependent on the pressure in the irrigation hose.

The use of protrusions responsive to the material deformation around the slit to create a narrow inlet that produces essentially all the hydrodynamic resistance, allows the protrusions to have a small height and be, therefore, easily incorporated in existing construction methods for tubes and tapes.

These and other features of the invention will be better understood through a study of the following detailed description of an embodiment of the invention when taken with the figures of the drawings. The scope of the invention, however, is limited only through the scope of the claims appended hereto.

BRIEF DESCRIPTION OF THE DRAWINGS

FIG. 2a show the cross-section of the hose in the middle of an emitter in the abscence of fluid pressure in the hose.

FIG. 2b show the cross-section of the hose in the middle of an emitter in the presence of fluid pressure in the hose.

DESCRIPTION OF THE PREFERRED EMBODIMENTS

The preferred embodiment of the invention presents a system for distributing irrigation fluid, the system comprising a hose 10 defining an inward fluid region in the form of a main flow-path 12 carrying irrigation fluid at pressure $P_1$, and emitters 14 spaced-apart along the hose and providing communication between the main flow-path and an outward receiving region external to the main flow-path and at pressure $P_2$ lower than $P_1$, the communication allowing fluid discharge from the main flow-path to the outward receiving region, the fluid discharge being weakly dependent on the pressure differential $P_1-P_2$ across each emitter.

1.0 The geometry

Figure 1:
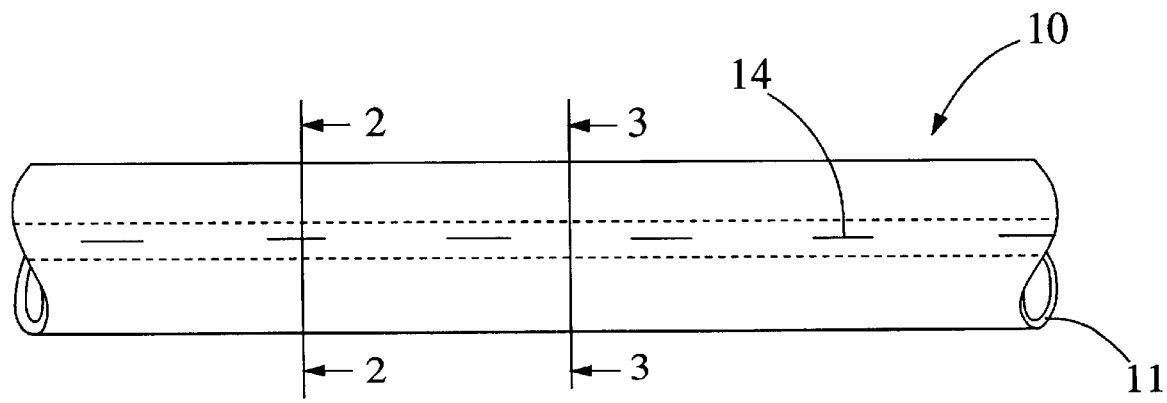
FIG. 1 shows the outside surface of the hose with spaced-apart emitters therein.
Figure 2:
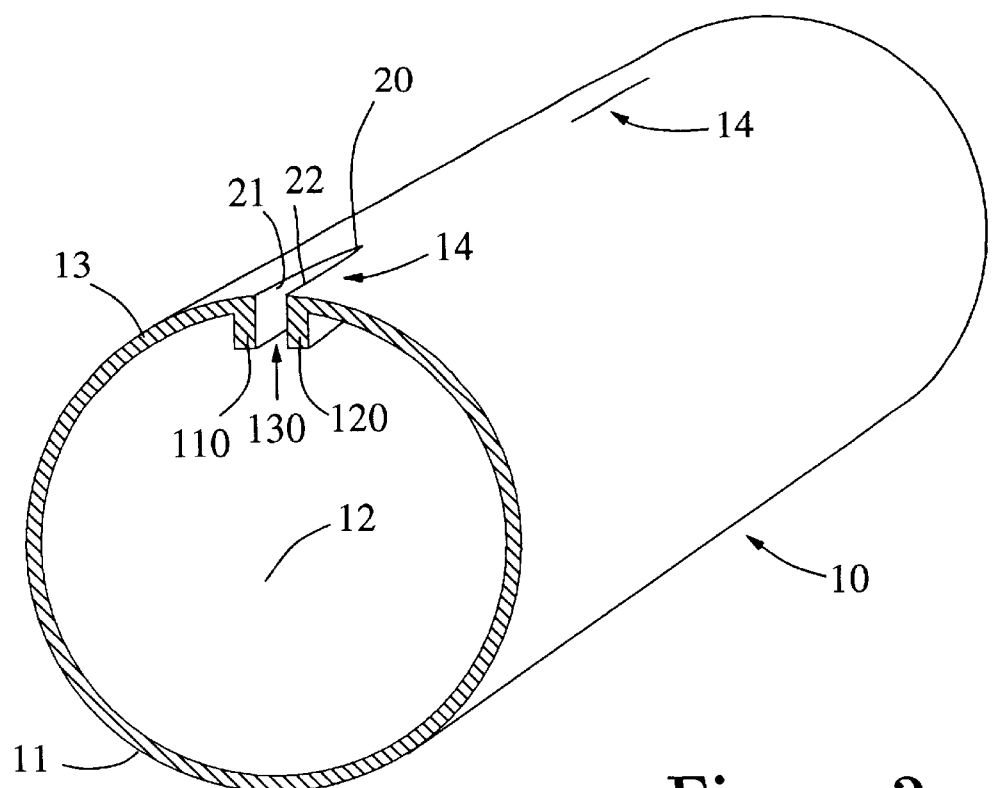
FIG. 2 shows a cross-section of the hose in the middle of an emitter. The displacements of the hose wall and the protrusions are exagerated to improve the visualization of the material deformations.
Figure 3:
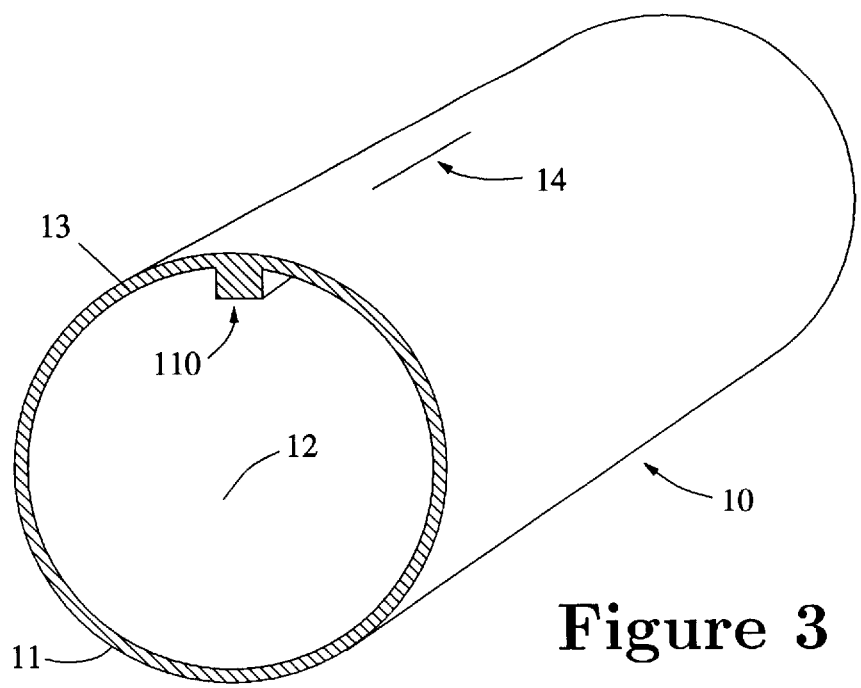
FIG. 3 shows a cross-section of the hose between slits.

Viewing now FIG. 1, 2 and 3, the hose 10 has a flexible wall 11 circumscribing and bounding the inward fluid region in the form of the main flow-path 12 for carrying irrigation fluid under pressure. The flexible wall 11 is made of a flexible material, such as plastic, that elastically deforms when pressurized fluid is present in the main flow-path. The main flow-path has conventional connecting means for connecting one or both of the main flow-path ends to a conventional source of irrigation fluid under pressure (not shown). At least a portion of the flexible wall, hereon after referred to as a single wall 13, directly separates the main flow path from the outward receiving region outside the main flow-path, the receiving region being at lower pressure than the pressure in the main flow-path, and receiving the irrigation fluid discharged through the emitters. In FIG. 1 the outward receiving region is the region exterior of the hose, and is not numbered for clarity. Furthermore, in FIG. 1 the single wall 13 completely circumscribes and bounds the main flow-path 12. Consequently, the single wall 13 is the entire portion of the flexible wall 11.

The controlled discharge of fluid from the main flow-path into the receiving region occurs through the spaced apart emitters 14 integrally build into the single wall portion of the flexible wall. The emitter appears externally of the single wall as a slit 20 of length L, and the emitters are separated from one another a distance of about 3 L or more. The slit is rectilinear in shape and penetrates completely through the single wall to dissect the single wall. For purposes of nomenclature, the perimeter of the slit can be separated into a first lip 21 and an opposing second lip 22.

Internally, the emitters have a first protrusion 110 and a second protrusion 120, materially attached to the single wall 13 near, or essentially at, the perimeter of the slit 20 and inwardly extending towards the center of the main flow-path 12. The first protrusion 110 is located near, and runs with, the first lip 21 and the second protrusion 120 is located near, and runs with, the second lip 22.

The first protrusion has a first tip 114 (FIG. 2a), a first side-wall 112 (FIG. 2b), a first outer surface 113, and a first base 111 whereat the first protrusion materially joins the single wall. Similarly, the second protrusion has a second tip 124, a second side-wall 122, a second outer surface 123, and a second base 121 whereat the second protrusion materially joins the single wall.

To facilitate manufacturing the hose having multiple emitters, the first and second protrusions are part of an internal ridge 100 (FIG. 3) running the length of the hose 10. During the manufacturing process, the hose 10 is first created with the internal ridge but without slits. For example, if the manufacturing process is extrusion, the ridge is created simultaneously with the hose, and if the process is tape rolling, folding and bonding, the ridge can be formed of a material different from that of the tape and united with the tape before tape folding and bonding.

Afterwards, one incision is made per emitter, the incision fully penetrating through the thickness of the single wall and through the thickness of the internal ridge to simultaneously create the slit and the first and second protrusions.

Furthermore, the merging of the first and second protrusion with the internal ridge at the ends of the slit adds reinforcing material that lowers the stress concentration at the extremities of the slit during operation.

Figure 4:
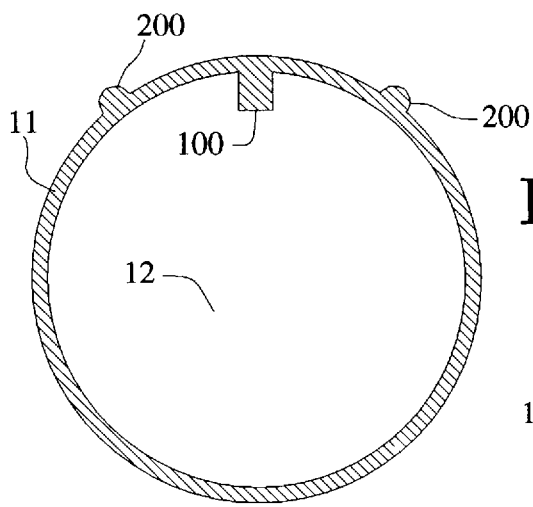
FIG. 4 shows the cross-section of a hose having external protrusions.
Figure 5:
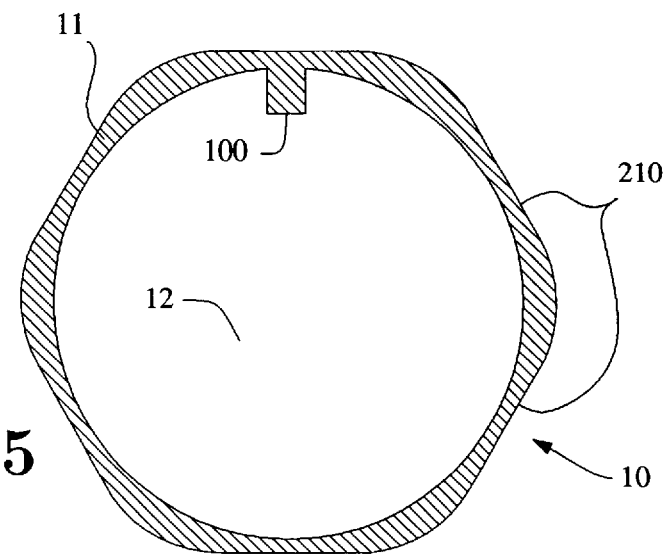
FIG. 5 shows the cross-section of a hose having an polygonal outer shape.

During manufacturing, the incision machine generating the slit must locate the internal ridge with enough precision to allow the incision to separate the internal ridge into the first and second protrusion. To aid this locating process, a locating means, such as external protrusions 200 (FIG. 4) or a polygonally shaped outer hose surface 210 (FIG. 5), is incorporated into the the hose, the locating means having a predetermined position and orientation relative to the internal ridge 100. The incision machine uses the locating means to correctly position the internal ridge for the incision.

1.1 The functionality

When the main flow-path is not pressurized, the first side-wall 112 (FIG. 2b) and the second side-wall 122 touch each other in facial contact to close the slit and prevent the ingestion through the slit of foreign matter. In particular, the presence of the first and second protrusions improves the slit closure by offering a greater sealing surface, and by delivering a stronger sealing force. When the irrigation hose 10 has lower pressure than the environment external to the hose, as often happens during shut-down of the irrigation system, a compressive circumferential stress develops in the hose wall, pressing the first side-wall and the second side-wall against each other and hindering the ingestion of external dirt and suspended particulates. This self-closing property allows the irrigation line to be operated without the vacuum-breaking valves of conventional buried drip irrigation system.

When the main flow-path is pressurized, the slit interrupts the circumferential stresses in the flexible wall, and a compound motion ensues, composed of:

1. a dilatation of the slit 20 and accompanying separation of the first protrusion 110 from the second protrusion 120, the separation forming an outwardly diverging discharge channel 301 having an inlet 130 facing the main flow-path, the channel connecting the main flow-path to the slit;
2. an outward displacement (relative to the main flow-path) of the wall in the neighborhood of the slit, with an accompanying rotational motion at the first base 111 and the second base 121, (the rotational motion at 111 is labled θ in FIG. 2b),
3. and a bending of first protrusion 110 under the action of differential pressure between side wall 112 and outer surface 113 and an opposite bending of the second protrusion 120 under the action of differential pressure between side wall 122 and outer surface 123.

The simultaneous presence of the dilatational motion and rotational motion at the slit and of the bending motion of the protrusions displaces, rotates, and deforms the first and second protrusions 110, 120 to bring the first tip 113 and the second tip 123 closer to each other and produce the discharge channel 301 having an inlet width, labeled as $\omega_1$ in FIG. 2b, that is less than the width of the discharge channel at the base of the first and second protrusions 111 121, labeled as $\omega_2$ in FIG. 2b. The narrowing of the cross-sectional area of the inlet gives rise to high hydrodynamic resistance to fluid flow as the fluid flows from the main flow-path 12 through the inlet 130 and out the slit 20. Furthermore, the discharge channel 301 has a divergent form in the direction of fluid flow, as shown by arrow 300, reducing the possibility of suspended particles jamming themselves into the channel during fluid discharge. In particular, the suspended particles too large to pass through the inlet 130 continue traveling along the irrigation hose. In addition, the narrow cross-sectional area of the inlet gives rise to a small water discharge jet with a velocity that is substantially higher than that from orifices of conventional drip systems. The high velocity of the discharged water further aids in preventing clogging and root intrusion.

For a hose of known geometry, built from a material of known elastic modulus, there are four main parameters that control the behavior of the pressure-compensated emitter:

p1) the length of the slit;
p2) the height (base to tip) of the first and second protrusions;
p3) the width of the first and second protrusions; and,
p4) the difference in elastic modulus between the first and second protrusions's material and the hose material.

Parameter p4 is not variable when the internal ridge 100 is formed simultaneously with the hose during extrusion.

Figure 6:
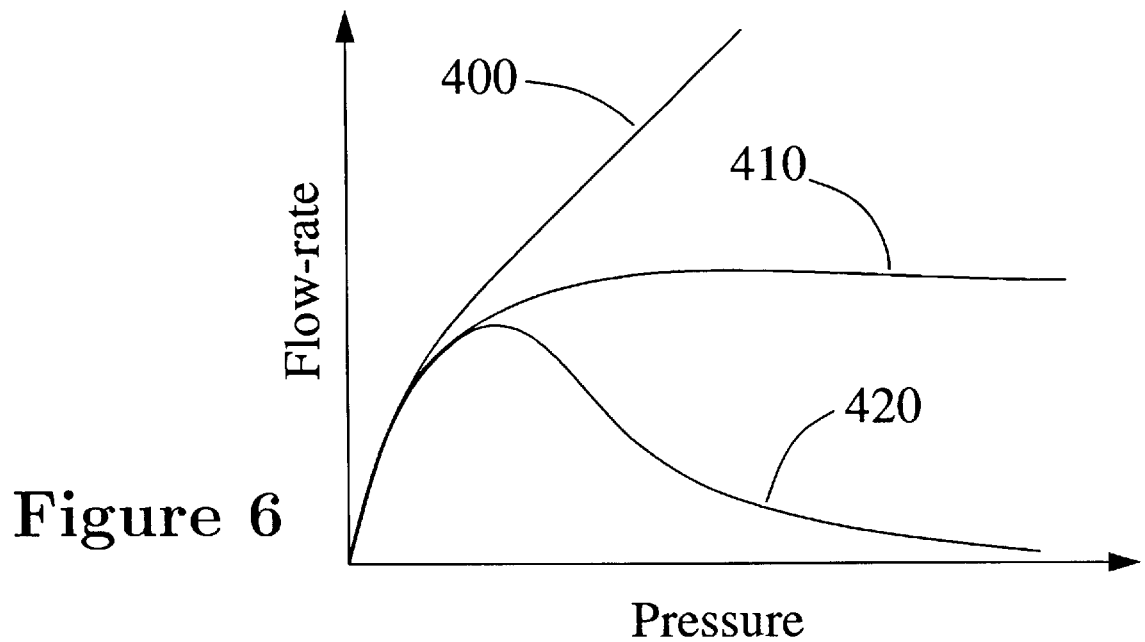
FIG. 6 shows a plot of flow-rate as function of pressure differential across the emitter for three different emitter geometries.

The width narrowing at the inlet 130, $\omega_1$, is controlled by the length of the slit 20 and by the thickness of the first and second protrusions 110, 120. Increasing slit length increases the amount of dilatational and rotational motion at, and near, the slit, while increasing first and second protrusion width reinforces and stiffens the material near and at the slit, resulting in diminishing dilatational and rotational motion, as well as reducing the bending deformation of the first and second protrusions. The height of the first and second protrusions, measured from base to tip, magnifies the effects of the rotational motion and the bending. In particular:

At low first and second protrusion heights, the base-widening motion dominates over the rotational and bending motion and the discharge channel widens at both base and inlet under the influence of increasing fluid pressure in the main flow-path. The resulting flow-rate as function of pressure is shown as curve 400 in FIG. 6.

At high first and second protrusion heights, the behavior at low pressure is similar to the low-protrusion-height case, but at higher pressures the rotational and bending motion dominates the base-widening motion and the discharge channel narrows rapidly at the inlet. The resulting rapid increase in hydrodynamic resistance with increasing pressure leads to a diminishing flow-rate as function of pressure, as shown at 420 in FIG. 6.

At mid first and second protrusion heights the behavior at low pressure is similar to the low and high protrusion-height cases, but at higher pressures the rotational and bending motion counterbalances and slightly dominates the base-widening motion to slowly narrow the discharge channel at the inlet. The resulting increase in hydrodynamic resistance counters the effect of increasing pressure to yield a discharge flow-rate weakly dependent on the pressure. The resulting flow-rate is shown as curve 410 in FIG. 6.

During fluid discharge through the emitter, the pressure differential between the first side-wall 112 and the first outer face 113 of the first protrusion and between the second side-wall 122 and second outer face 123 of the second protrusion creates opposing forces that push the first and second protrusions towards each other, thus helping reduce the inlet width $\omega_2$ of the discharge channel 301. Making the first and second protrusions more flexible by lowering the elastic modulus of the first and second protrusions' material increases the effect of these opposing forces.

1.2 Further embodiments

The pressure-compensating emitter can be directly applied to the case wherein the receiving region is enclosed within the hose itself. Viewing FIG. 7, the hose 10 has the flexible wall 11 partially overlapping and sealing with itself to create a secondary flow-path 330 external to the main flow-path 12. The secondary flow-path 330 is the outward receiving region in this embodiment of the invention. The single wall 13 separates the main and secondary flow-paths, and on this wall the emitter 14 is located. The emitter is, thus, internal to the hose and discharges into the secondary flow-path 330.

Figure 7:
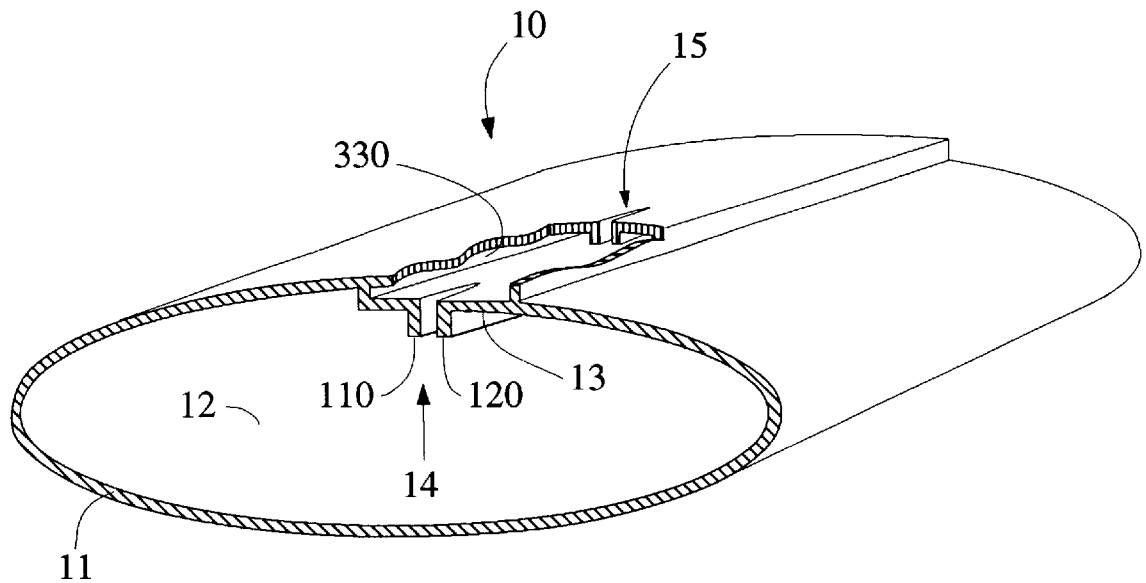
FIG. 7 shows a perspective view and cross-cut of a hose with two fluid paths.

In another embodiment of the invention, best suited to the case when the pressure differential between the main flow-path 12 and the region external to the hose exceeds the pressure-compensating range of the internally located emitter 14, an additional externally discharging emitter, shown at 15 in FIG. 7, connects the secondary flow-path 330 to the region external to the hose. In this embodiment, the total pressure differential between the main flow-path 12 and the region external to the hose is partitioned between the internal and the external emitters 14, 17.

1.3 Specific examples

For a given hose size, wall thickness and wall elastic modulus, the slit length and first and second protrusion height and width have been determined with the aid of conventional finite-element simulations and with the aid of conventional flow-rate versus pressure-drop measurements.

For a hose with a flexible wall of uniform 0.04 inch thickness and of 9500 psi material elastic modulus, and with the wall circumscribing and bounding a main flow-path circular in cross section with a diameter of 0.52 inch, a pressure-compensated emitter built from the same material as the hose and discharging into the atmosphere has a slit length of 0.095 inch, and equal first and second protrusion height of 0.112 inches and width of 0.029 inches. The emitter's discharge flow-rate increases from 0 to 30 cubic centimeters per minute (cc/min) as the pressure in the main flow-path increases from 0 to 20 pounds per square inch gage (psig). In this range of pressure the emitter is not pressure compensated. In the range of pressures between 20 and 60 psig, the discharge flow-rate through the emitter varies between 30 cc/min and 25 cc/min, thus exhibiting a weak dependency on pressure and achieving a pressure-compensated functionality.

The pressure-compensated functionality is also found when the same hose and emitter geometry described in the above paragraph is built using a stiffer flexible material with an elastic modulus of 30,000 psi. The emitter's discharge flow-rate increases from 0 to 250 cubic centimeters per minute (cc/min) as the pressure in the main flow-path increases from 0 to 20 psig. In this range of pressure the emitter is not pressure compensated. In the range of pressures between 20 and 60 psig, the discharge flow-rate through the emitter varies between 250 cc/min and 200 cc/min and is pressure compensated.

The pressure-compensating functionality is lost when the slit and protrusion parameters p1 through p4 are changed substantially from the values providing the functionality. As a measure of the sensitivity of these parameters, we note that, in the above described case of the 9500 psi material, increasing the slit length from 0.095 inches to 0.225 inches produces decreasing flow-rate past 20 psig, down to zero flow-rate at 60 psig, thus destroying the pressure compensated functionality of the emitter. Increasing the protrusion height has a similar behavior to increasing slit length, so that the essentially the same undesirable behavior of the 0.225 inch slit length with 0.112 inch protrusion height is obtained with a 0.095 inch slit length and protrusion height of 0.125 inch.

Figure 8:
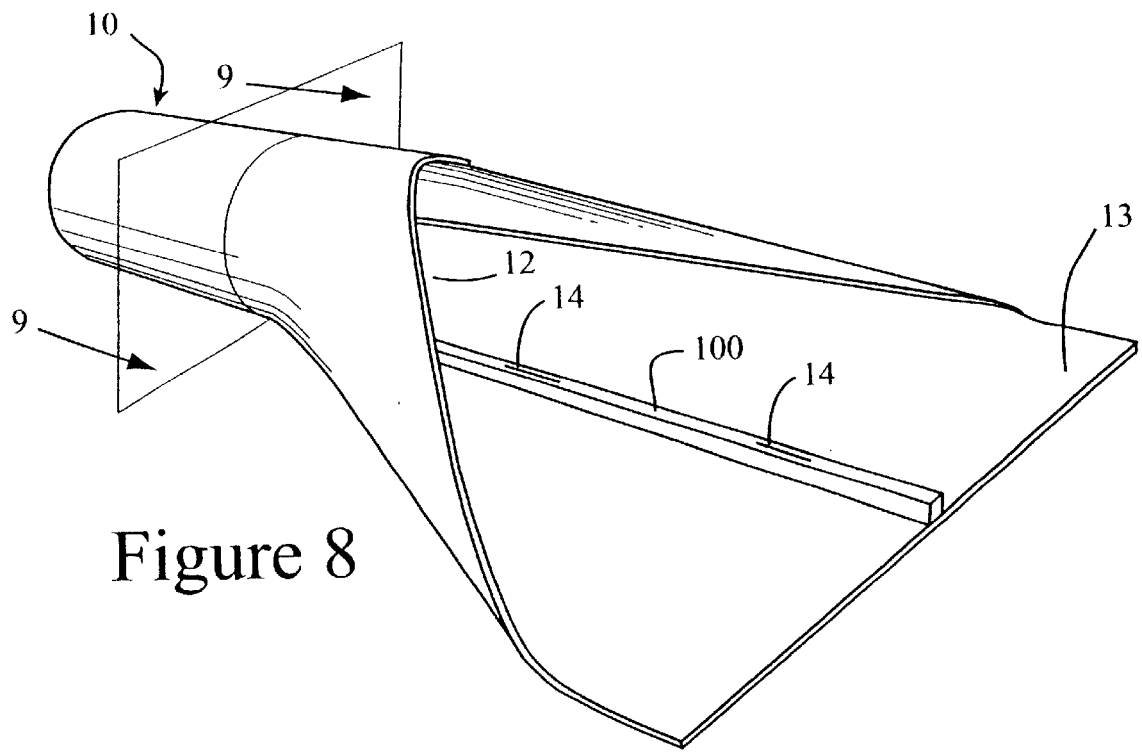
Figure 9:
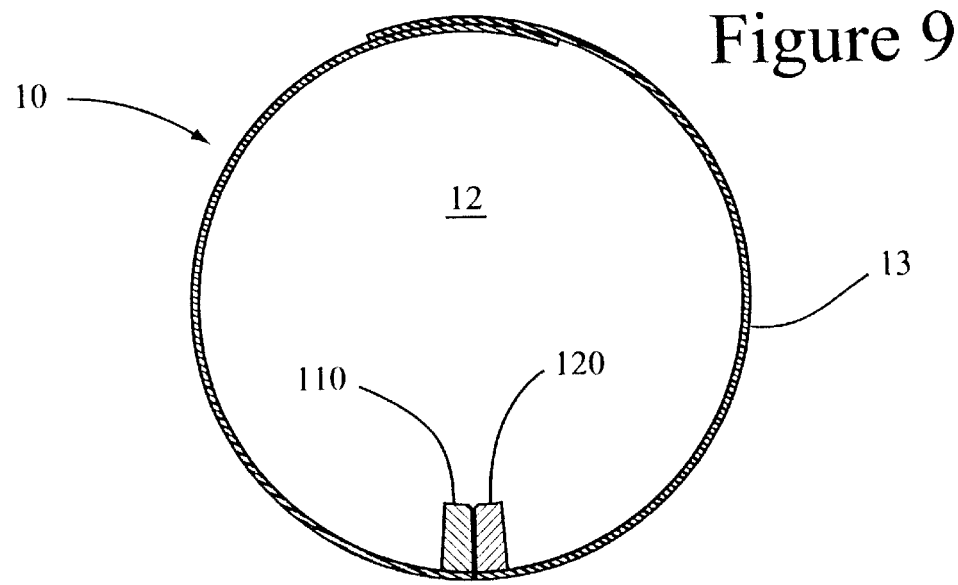

In reference to FIGS. 8 and 9, for a hose 10 formed by a high density polyethylene strip of uniform 0.01 inch thickness 13 having an elastic modulus of about 200,000 psi and with the sides of the strip welded to each other to form and bound a main flow-path 12 circular in cross section with a diameter of 0.73 inch, a pressure-compensated emitter discharging into the atmosphere has a slit 14 of length of 0.1 inch, and equal first 110 and second 120 protrusion height of 0.09 inches and width of 0.045 inches. The protrusions are made of a flexible material with elastic modulus of about 1000 psi, bondedly attached to the thin flexible wall 13. The emitter's discharge flow-rate increases from 0 to 1.9 cc/min as the pressure in the main flow-path increases from 0 to 5 psig. In this range of pressure the emitter is not pressure compensated. In the range of pressures between 5 and 30 psig, the discharge flow-rate through the emitter varies between 1.9 cc/min and 2.0 cc/min, thus exhibiting a weak dependency on pressure and achieving a pressure-compensated functionality.

Thus, there is provided in accordance with the invention a pressure compensated drip irrigation device that provides for a more uniform distribution of irrigation fluid along the length of the irrigation line.

We claim:

1. In combination with a flexible wall separating an inward fluid region at pressure $P_1$ from an outward receiving region at pressure $P_2$, where $P_2 < P_1$, an emitter for discharging fluid from the inward fluid region to the outward receiving region, the emitter comprising:

at least one slit extending through the flexible wall, the slit interrupting tensile stresses in the flexible wall to cause both a dilatation of the slit and an outward displacement in the flexible wall material adjacent to, and around the slit, the amount of dilatation and outward displacement increasing with increasing pressure differential across the flexible wall, the slit being essentially closed in the absence of said pressure differential; and protrusions connected to the flexible wall and extending from the perimeter of the slit towards the inward fluid region to form an outwardly diverging discharge channel with an inlet facing the inward fluid region, said discharge channel connecting the inward fluid region to the slit, said protrusions narrowing the cross-sectional area of the inlet to increase the hydrodynamic resistance of the discharge channel in response to said dilatation of the slit and to said outward displacement of the wall material adjacent to and around said slit, the protrusions increasing the hydrodynamic resistance in response to an increase in slit dilatation and outward displacement following an increase in pressure differential $P_1-P_2$, to produce a discharge flow-rate weakly dependent on the pressure $P_1$.

2. The combination of claim 1, wherein the protrusions are responsive to the pressure differential between the pressure $P_1$ and the pressure in the discharge channel.

3. A system for distributing irrigation fluid, the system comprising:
   a) a hose with a flexible wall circumscribing and bounding a main flow-path for carrying irrigation fluid, connecting means for connecting the main flow path at one of the main flow path ends to a source of irrigation fluid under pressure, an outward receiving region outwardly located with respect to the main flow-path and at a lower pressure than the pressure in the main flow-path, at least a portion of the flexible wall directly separating the main flow-path from said outward receiving region; and
   b) at least one emitter located on the wall portion and providing communication for fluid flow between the main flow-path and the receiving region, the emitter having:
      b-1) a slit fully penetrating through the wall portion the slit interrupting the stresses in the wall portion when said main flow-path carries irrigation fluid under pressure, the stress interruption simultaneously causing a dilatation of the slit and an outward displacement in the material adjacent to, and around the slit, the slit being essentially closed in the absence of pressure in the irrigation fluid; and
      b-2) protrusions connected to the wall portion and extending from the perimeter of the slit towards the main flow-path to form an outwardly diverging discharge channel with an inlet facing the main flow-path, said discharge channel connecting the main flow-path to the slit, said protrusions narrowing the cross-sectional area of the inlet to increase the hydrodynamic resistance of the discharge channel in response to said dilatation of tie slit and to said outward displacement of the wall material adjacent to and around said slit. tile protrusions increasing the hydrodynamic resistance in response to an increase in slit dilatation and outward displacement following ail increase in pressure differential between the pressure in the main flow-path and the pressure in the outward receiving region enabling the hydrodynamic resistance produced by the narrowed inlet to counteract the main flow pressure to produce a discharge flow-rate weakly dependent on the main flow-path pressure.

4. The system of claim 3 wherein the protrusions are responsive to the pressure differential between the main flow-path pressure and the pressure in the discharge channel.

5. The system of claim 3, in which the receiving region is a secondary flow-path within the hose, the secondary flow-path linking the main flow-path to the outside of the hose.

6. The system of claim 3, in which the protrusions are made from a material different from the material of the flexible wall.

7. The system of claim 3 wherein an internal ridge running at least part of the length of the hose forms the protrusions.

8. The system of claim 7 wherein the external surface of the hose has locating means for positioning the internal ridge into a predetermined orientation relative to the slit.

9. The system of claim 8 wherein the locating means is a polygonally shaped outer hose surface.

10. The combination of claim 8 wherein the locating means comprise at least one outwardly extending protrusion on the outer hose surface.

* * * * *